United States Patent
Cho et al.

(10) Patent No.: US 9,937,925 B2
(45) Date of Patent: Apr. 10, 2018

(54) SHIFT CONTROL METHOD FOR HYBRID VEHICLE WITH DCT

(71) Applicant: Hyundai Motor Company, Seoul (KR)

(72) Inventors: Sung Hyun Cho, Yongin-si (KR); Ju Hyun Nam, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 224 days.

(21) Appl. No.: 15/094,199

(22) Filed: Apr. 8, 2016

(65) Prior Publication Data

US 2017/0129494 A1    May 11, 2017

(30) Foreign Application Priority Data

Nov. 10, 2015 (KR) .................. 10-2015-0157192

(51) Int. Cl.
*B60W 30/00* (2006.01)
*B60W 30/18* (2012.01)
(Continued)

(52) U.S. Cl.
CPC ......... *B60W 30/18127* (2013.01); *B60K 6/48* (2013.01); *B60K 6/547* (2013.01); *B60W 10/02* (2013.01); *B60W 10/08* (2013.01); *B60W 10/113* (2013.01); *B60W 20/15* (2016.01); *B60W 30/19* (2013.01); *B60K 2006/4825* (2013.01); *B60W 20/00* (2013.01); *B60W 2510/025* (2013.01); *B60W 2510/0275* (2013.01); *B60W 2510/083* (2013.01); *B60W 2510/088* (2013.01); *B60W 2510/102* (2013.01); *B60W 2510/1095* (2013.01);
(Continued)

(58) Field of Classification Search
None
See application file for complete search history.

(56) References Cited

U.S. PATENT DOCUMENTS 6,890,283 B2 * 5/2005 Aoki .................. B60K 6/44
477/5
7,351,183 B2 * 4/2008 Fujii .................. F16H 61/061
477/109
(Continued)

FOREIGN PATENT DOCUMENTS

JP    2012-90507    5/2012
JP    2012-116272    6/2012
(Continued)

*Primary Examiner* — Jonathan M Dager
(74) *Attorney, Agent, or Firm* — Brinks Gilson & Lione

(57) ABSTRACT

The present disclosure provides a shift control method for a hybrid vehicle with a DCT that includes: a shifting state-determining step in which a controller determines whether an inertia phase of power-off down-shift is entered; a motor torque-adjusting step that request to reduce regenerative braking torque of a motor as much as a predetermined requested reduction amount, when the controller determines that the inertia phase has been entered in the shifting state-determining step; and a clutch torque-reducing step that ends the motor torque-adjusting step and reduces torque of an engagement clutch, when the requested reduction amount of the regenerative braking torque of the motor is less than zero while the controller performs the motor torque-adjusting step.

5 Claims, 3 Drawing Sheets

(51) Int. Cl.
  *B60K 6/48*     (2007.10)
  *B60W 10/02*    (2006.01)
  *B60W 10/08*    (2006.01)
  *B60K 6/547*    (2007.10)
  *B60W 10/113*   (2012.01)
  *B60W 30/19*    (2012.01)
  *B60W 20/15*    (2016.01)
  *B60W 20/00*    (2016.01)
  *F16H 3/00*     (2006.01)

(52) U.S. Cl.
  CPC ... *B60W 2540/10* (2013.01); *B60W 2710/022* (2013.01); *B60W 2710/027* (2013.01); *B60W 2710/083* (2013.01); *F16H 3/006* (2013.01); *Y02T 10/76* (2013.01)

(56) References Cited

U.S. PATENT DOCUMENTS

| | | | | |
|---|---|---|---|---|
| 2004/0166990 A1* | 8/2004 | Buchanan | | B60W 10/02 477/174 |
| 2006/0108163 A1* | 5/2006 | Kitano | | B60K 6/485 180/65.26 |
| 2011/0312461 A1* | 12/2011 | Park | | B60K 6/365 475/5 |
| 2012/0234133 A1* | 9/2012 | Ikegami | | B60K 6/48 74/661 |
| 2012/0244993 A1* | 9/2012 | Ishida | | F16H 61/66259 477/39 |
| 2013/0231815 A1* | 9/2013 | Tanishima | | B60K 6/48 701/22 |
| 2014/0195131 A1* | 7/2014 | Porto | | F16H 61/688 701/60 |
| 2015/0088348 A1* | 3/2015 | Lee | | B60W 10/11 701/22 |
| 2015/0142282 A1* | 5/2015 | Lee | | F16H 61/0213 701/58 |
| 2015/0167755 A1* | 6/2015 | Yoon | | F16H 61/12 701/53 |
| 2015/0308522 A1* | 10/2015 | Cho | | F16D 48/062 701/68 |
| 2015/0337952 A1* | 11/2015 | Cho | | B60W 10/10 701/54 |
| 2016/0059845 A1* | 3/2016 | Nefcy | | B60W 20/30 477/115 |
| 2016/0152144 A1* | 6/2016 | Choi | | B60L 7/26 701/70 |
| 2017/0067559 A1* | 3/2017 | Cho | | F16H 61/688 |
| 2017/0096069 A1* | 4/2017 | Cho | | B60L 7/18 |
| 2017/0356546 A1* | 12/2017 | Cho | | B60W 20/00 |

FOREIGN PATENT DOCUMENTS

| | | |
|---|---|---|
| JP | 2013-126812 | 6/2013 |
| JP | 2014-097789 A | 5/2014 |
| KR | 10-2006-0067698 A | 6/2006 |
| KR | 10-2014-0073980 | 6/2014 |

\* cited by examiner

SHIFT CONTROL METHOD FOR HYBRID VEHICLE WITH DCT

CROSS REFERENCE TO RELATED APPLICATION

The present application claims priority to and the benefit of Korean Patent Application No. 10-2015-0157192, filed Nov. 10, 2015, which is incorporated by reference in its entirety.

FIELD

The present disclosure relates to a shift control method for a hybrid vehicle with a Double Clutch Transmission (DCT).

BACKGROUND

The statements in this section merely provide background information related to the present disclosure and may not constitute prior art.

In a hybrid vehicle, regenerative braking using a motor is performed to increase fuel efficiency while a vehicle is decelerated, and the power generated in this process is returned as electric energy.

Further, when a vehicle brakes and decelerates, the vehicle speed decreases and the transmission performs down-shift, but in a hybrid vehicle with a DCT connected with a motor, it is desired to perform power-off down-shift simultaneously with regenerative braking.

As used herein, power-off down-shift generally means shifting to a lower gear step without pressing an acceleration pedal. Further, as used herein heavy breaking generally means braking with the brake pedal pressed by at least 30% of full brake stroke (i.e., 100% braking).

The foregoing is intended merely to aid in the understanding of the background of the present disclosure, and is not intended to mean that the present disclosure falls within the purview of the related art that is already known to those skilled in the art.

SUMMARY

The present disclosure proposes a shift control method for a hybrid vehicle with a DCT that may improve quality of shifting and accordingly improve the commercial value of a vehicle by quickly and smoothly performing power-off down-shift in heavy braking of a hybrid vehicle with a DCT connected with a motor.

Accordingly, the present disclosure proposes a shift control method for a hybrid vehicle with a DCT that includes: a shifting state-determining step in which a controller determines whether an inertia phase of power-off down-shift has been entered; a motor torque-adjusting step that requests to reduce regenerative braking torque of a motor as much as a predetermined requested reduction amount, when the controller determines that the inertia phase has been entered in the shifting state-determining step; and a clutch torque-reducing step that ends the motor torque-adjusting step and reduces torque of an engagement clutch, when the requested reduction amount of the regenerative braking torque of the motor is less than zero while the controller performs the motor torque-adjusting step.

The requested reduction amount for reducing the regenerative braking torque of the motor in the motor torque-adjusting step may be determined in accordance with the engagement clutch torque, the slip change rate of the engagement clutch, and the speed change rate of the engagement input shaft.

The requested reduction amount for reducing the regenerative braking torque of the motor in the motor torque-adjusting step may be determined by the following equation, $$\text{Requested reduction amount} = -Tc + Jm*(d\text{Slip}/dt + dNi/dt)$$

where,

Tc; engagement clutch torque
Jm; moment of inertia of motor
Slip; slip amount of engagement clutch (=Nm−Ni)
Ni; speed of engagement input shaft
Nm; motor speed In the clutch torque-reducing step, a reduction amount of the engagement clutch torque may be calculated in the same manner as the requested reduction amount calculated in the motor torque-adjusting step.

The controller may perform the shifting state-determining step that determines whether the inertia phase of power-off down-shift has been entered on the basis of engagement clutch torque, disengagement clutch torque, a motor speed, and an APS signal; may calculate the requested reduction amount in the motor torque-adjusting step and request a motor controller to reduce the regenerative braking torque as much as the requested reduction amount; and may stop the request for the motor controller to reduce the regenerative braking torque and reduce the engagement clutch torque by controlling a clutch actuator in the clutch torque-reducing step.

According to the present disclosure, it is possible to improve quality of shifting and accordingly improve the commercial value of a vehicle by quickly and smoothly performing power-off down-shift in heavy braking of a hybrid vehicle with a DCT connected with a motor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
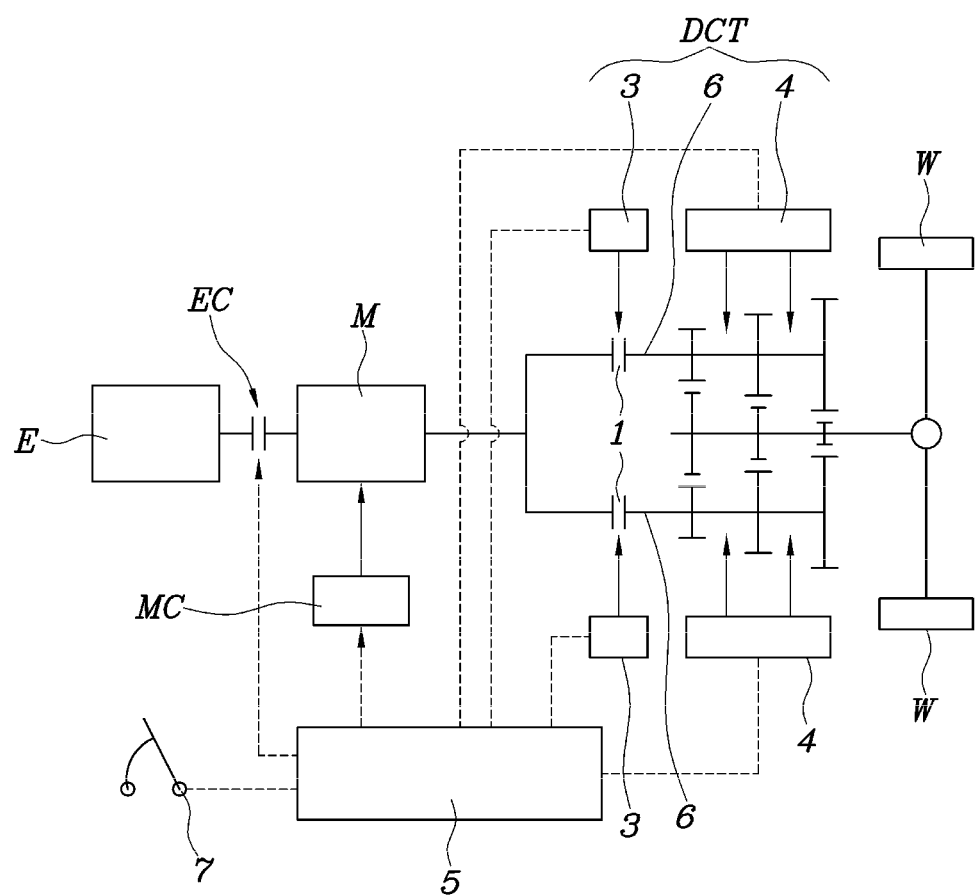
FIG. 1 is a diagram showing the configuration of a hybrid vehicle with a DCT to which the present disclosure can be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram showing the configuration of a hybrid vehicle with a DCT to which the present disclosure can be applied, in which an engine clutch EC is disposed between an engine E and a motor M, the motor M is connected to driving wheels W through a DCT, the DCT includes two clutches 1, a clutch actuator 3 for operating the clutches 1, and a shifting actuator 4 for selecting gear steps, and a controller 5 controls the clutch actuator 3 and the shifting actuator 4.

The clutches 1 of the DCT are connected with input shafts 6, respectively, so in shifting, the input shaft and the clutch connected to the current shifted gear step are a disengagement input shaft and a disengagement clutch, and the input shaft and the clutch connected to a desired gear step are an engagement input shaft and an engagement clutch.

The motor M is controlled by a separate motor controller MC, so it is possible to control regenerative braking torque of the motor M in response to a request from the controller 5, which will be described below.

For reference, the term 'controller' simply stated herein means, for discrimination, a transmission controller that controls the clutch actuator 3 and the shifting actuator 4. The controller may include a computer, processor and/or electronic circuit that is programmed or arranged for controlling the clutch actuators.

The controller 5 and the motor controller MC are independent parts, but they may be implemented as a single controller.

The controller 5 can control the engine clutch EC and receive a signal from an APS (Accelerator Pedal Sensor, 7).

Figure 2:
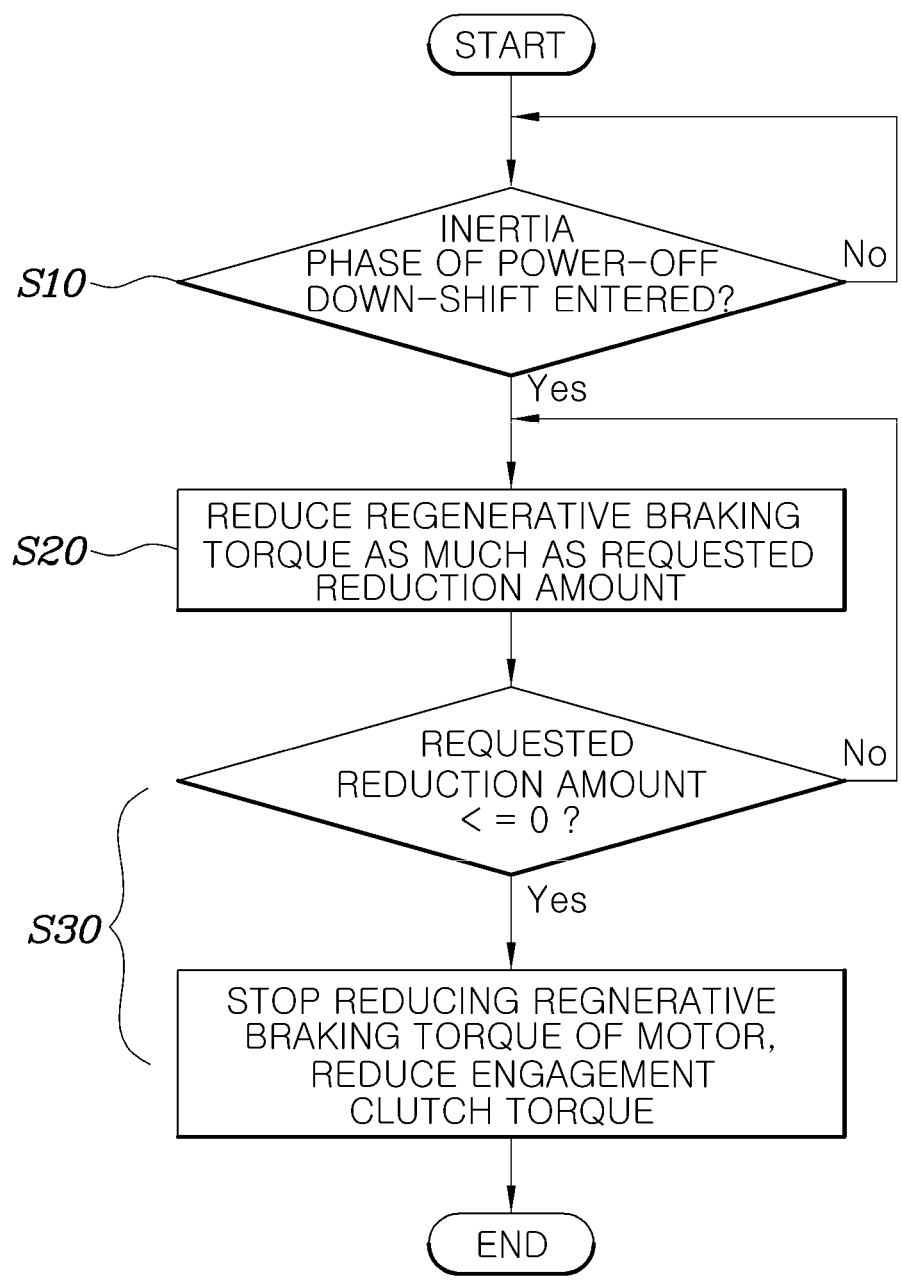
FIG. 2 is a flowchart illustrating one form of a shift control method for a hybrid vehicle with a DCT according to the present disclosure.

FIG. 2 is a flowchart illustrating one form of a shift control method for a hybrid vehicle with a DCT according to the present disclosure. The method includes: a shifting state-determining step in which the controller 5 determines whether an inertia phase of power-off down-shift has been entered (S10); a motor torque-adjusting step that requests to reduce regenerative braking torque of the motor M as much as a predetermined requested reduction amount (S20), when the controller 5 determines that the inertia phase has been entered in the shifting state-determining step; and a clutch torque-reducing step that ends the motor torque-adjusting step (S20) and reduces the torque of an engagement clutch (S30), when the requested reduction amount of the regenerative braking torque of the motor M is less than zero while the controller 5 performs the motor torque-adjusting step (S20).

The fact that the requested reduction amount is less than zero means that the value obtained from the following equation for calculating a requested reduction amount is less than zero.

Figure 3:
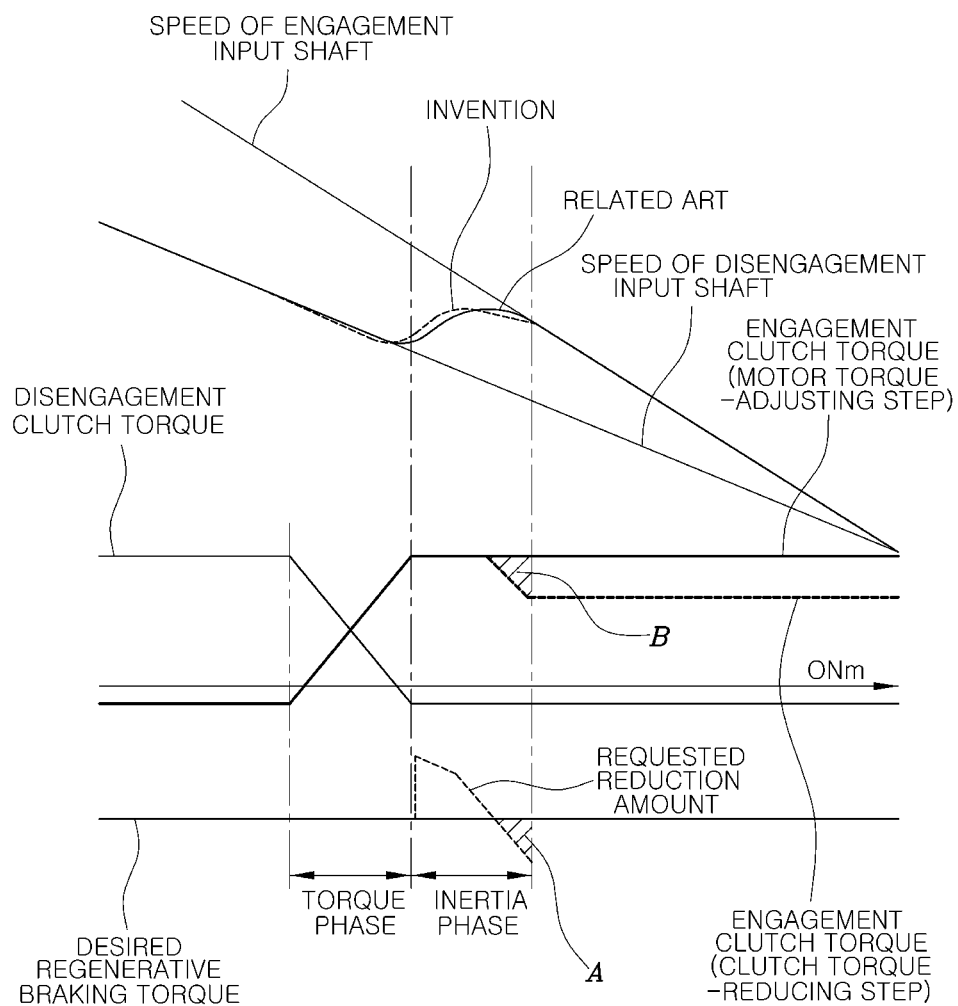
FIG. 3 is a graph illustrating a shift control method of a vehicle with a DCT according to the present disclosure.

That is, as shown in FIG. 3, when the torque phase of power-off down-shift is finished and an inertia phase is entered in the shifting state-determining step (S10), the regenerative braking torque by the motor M is reduced such that the speed of the motor M relatively quickly increases to the speed of the engagement input shaft through the motor torque-adjusting step (S20). When the speed of the motor increases close to the speed of the engagement input shaft, the slip amount of the engagement clutch decreases, and a requested reduction amount of the regenerative braking torque becomes less than zero, reduction of regenerative braking torque by the motor is stopped, and the torque of the engagement clutch is reduced such that the motor speed is smoothly synchronized with the speed of the engagement input shaft, so that quick and smooth shifting is achieved.

The controller 5 performs the shifting state-determining step (S10) that determines whether the inertia phase of power-off down-shift has been entered on the basis of engagement clutch torque, disengagement clutch torque, a motor speed, and an APS signal, calculates the requested reduction amount in the motor torque-adjusting step (S20), and requests the motor controller MC to reduce the regenerative braking torque as much as the requested reduction amount.

The requested reduction amount for reducing the regenerative braking torque of the motor in the motor torque-adjusting step (S20) is determined in accordance with the engagement clutch torque, the slip change rate of the engagement clutch, and the speed change rate of the engagement input shaft.

That is, in the motor torque-adjusting step (S20), the requested reduction amount for reducing the regenerative braking torque of the motor can be determined by the following equation.

$$\text{Requested reduction amount} = -Tc + Jm*(dSlip/dt + dNi/dt)$$

where,
Tc; engagement clutch torque
Jm; moment of inertia of motor
Slip; slip amount of engagement clutch (=Nm−Ni)
Ni; speed of engagement input shaft
Nm; motor speed On the other hand, in the clutch torque-reducing step (S30), the reduction amount of the engagement clutch torque is calculated in the same as the requested reduction amount calculated in the motor torque-adjusting step (S20).

That is, when the clutch torque-reducing step (S30) is entered, the controller 5 stops the request for the motor controller MC to reduce the regenerative braking torque as much as the requested reduction amount, but controls the clutch actuator 3 by subtracting a reduction amount, which is the torque calculated from the equation through the clutch actuator 3, from the original engagement clutch torque.

That is, after the inertia phase is entered, the engagement clutch torque is determined and controlled by the following equation during the motor torque-adjusting step (S20).

$$Tc = -Tm + Jm*dNm/dt$$

Thereafter, when the clutch torque-reducing step (S30) is started, the engagement clutch torque is determined and controlled by the following equation.

$$Tc = -Tm + Jm*dNm/dt - \text{requested reduction amount}$$

Referring to FIG. 3, in power-off down-shift, regenerative braking torque of a motor is generally controlled, for example, at a constant desired regenerative braking torque in accordance with the pressed amount of a brake pedal by a driver. In this form, when an inertia phase is entered, the regenerative braking torque of a motor is reduced as much as the requested reduction amount such that the speed of the motor more quickly increases to the speed of the engagement input shaft in the early stage of the inertia phase in order to reduce the shifting time. Further, in the last stage of the inertia phase in which the slip amount of the engagement clutch decreases, torque corresponding to the requested reduction amount for the regenerative braking torque of the motor is reduced from the engagement clutch torque so that the speed of the motor increasing to the speed of the engagement input shaft is relatively decreased by the reduction of the engagement clutch torque, and accordingly, the speed of the motor and the speed of the engagement input shaft are relatively smoothly synchronized. Therefore, shifting shock is inhibited or prevented and smooth shifting can be achieved.

That is, according to the present disclosure, shifting is quickly performed by reducing the regenerative braking torque of a motor in the early stage of an inertia phase of power-off down-shift, while the engagement clutch torque is reduced such that the speeds of the motor and the engagement input shaft are smoothly synchronized in the last stage of the inertia phase, in order to improve shifting quality through quick and smooth shifting.

For reference, in FIG. 3, the desired regenerative braking torque of a motor is basically negative torque applied in the opposite direction to the driving direction of a vehicle and the negative torque is maintained even though the torque has been increased by the requested reduction amount, so regenerative braking is maintained.

In FIG. 3, the area A is torque that is calculated from the equation for a requested reduction amount in the clutch torque-reducing step, and this torque is converted into the reduction amount of the engagement clutch, which is the area B.

In FIG. 3, by the control of the present disclosure described above, the motor speed increases higher than the related art by reduction of regenerative braking torque of the motor in the early stage of the inertia phase, but the motor speed is more smoothly synchronized with the speed of the engagement input shaft in the last stage of the inertia phase.

Although the present disclosure was described with reference to specific forms shown in the drawings, it is apparent to those skilled in the art that the present disclosure may be changed and modified in various ways without departing from the scope of the present disclosure.

What is claimed is:

1. A shift control method for a hybrid vehicle with a DCT, the method comprising:
   a shifting state-determining step in which a controller determines whether an inertia phase of power-off down-shift has been entered;
   a motor torque-adjusting step that requests to reduce regenerative braking torque of a motor as much as a predetermined requested reduction amount, when the controller determines that the inertia phase has been entered in the shifting state-determining step; and
   a clutch torque-reducing step that ends the motor torque-adjusting step and reduces torque of an engagement clutch, when a requested reduction amount of the regenerative braking torque of the motor is less than zero while the controller performs the motor torque-adjusting step.

2. The method of claim 1, wherein the requested reduction amount of the regenerative braking torque of the motor in the motor torque-adjusting step is determined in accordance with the torque of the engagement clutch, a slip change rate of the engagement clutch, and a speed change rate of an engagement input shaft.

3. The method of claim 2, wherein the requested reduction amount for reducing the regenerative braking torque of the motor in the motor torque-adjusting step is determined by the following equation, $$\text{Requested reduction amount} = -Tc + Jm*(d\text{Slip}/dt + dNi/dt)$$

where,
Tc; engagement clutch torque
Jm; moment of inertia of motor
Slip; slip amount of engagement clutch (=Nm−Ni)
Ni; speed of engagement input shaft
Nm; motor speed.

4. The method of claim 3, wherein in the clutch torque-reducing step, a reduction amount of the engagement clutch torque is calculated in the same as the requested reduction amount calculated in the motor torque-adjusting step.

5. The method of claim 1, wherein the controller performs the shifting state-determining step that determines whether the inertia phase of power-off down-shift has been entered based on an engagement clutch torque, a disengagement clutch torque, a motor speed, and an APS signal; calculates an requested reduction amount in the motor torque-adjusting step and requests a motor controller to reduce the regenerative braking torque as much as the requested reduction amount; and stops the request for the motor controller to reduce the regenerative braking torque and reduces the torque of the engagement clutch by controlling a clutch actuator in the clutch torque-reducing step.

* * * * *